Nov. 21, 1961   J. L. DIXON ET AL   3,009,195
APPARATUS FOR FILLING SAUSAGE MOLDS
Filed Oct. 6, 1958   2 Sheets-Sheet 1
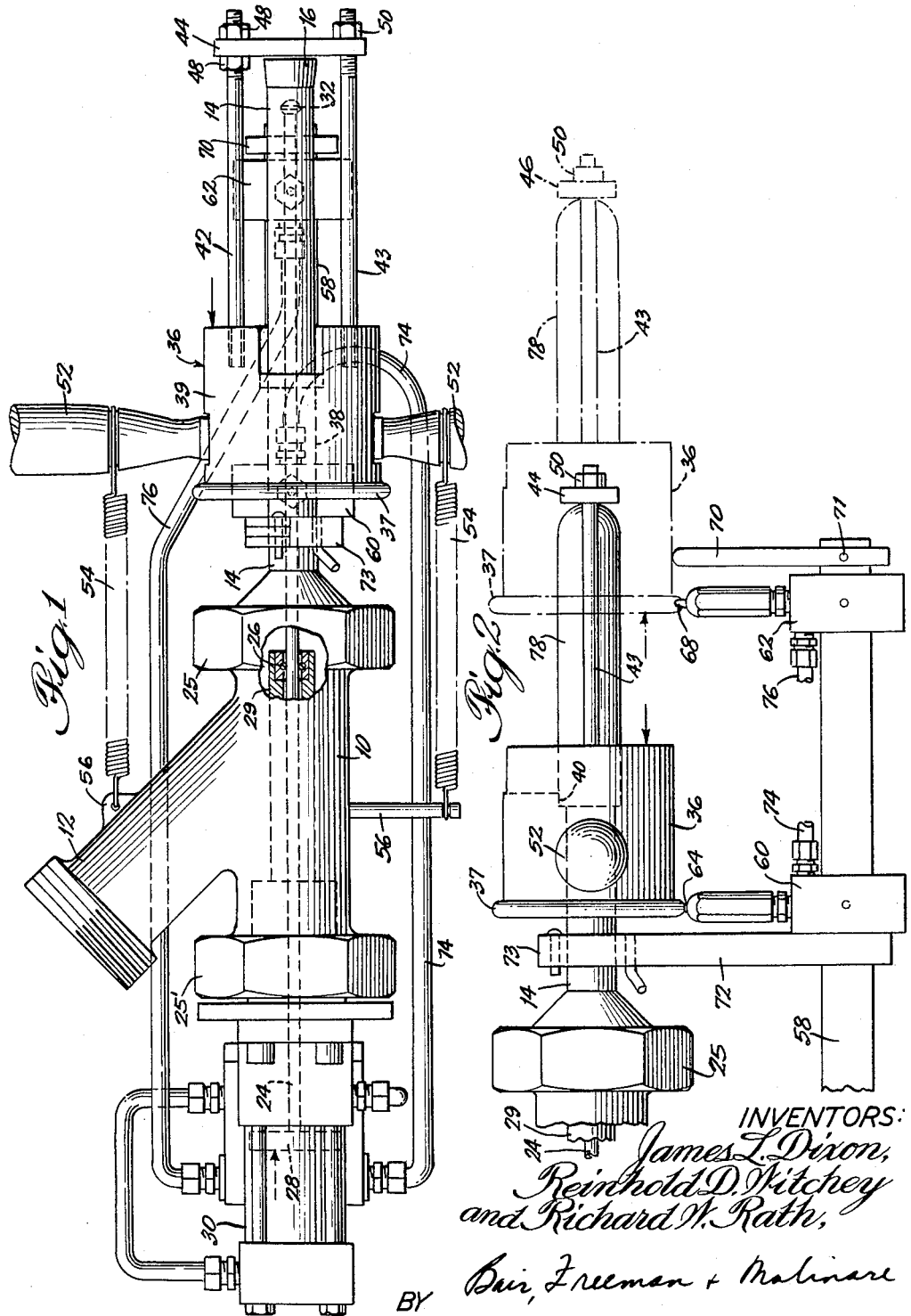
INVENTORS:
James L. Dixon,
Reinhold D. Witchey
and Richard W. Rath,
BY Bair, Freeman + Molinare
ATTORNEYS.

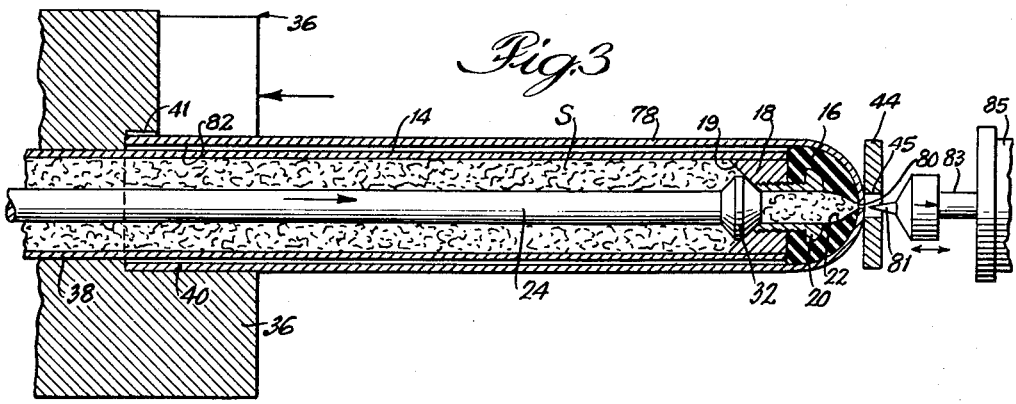
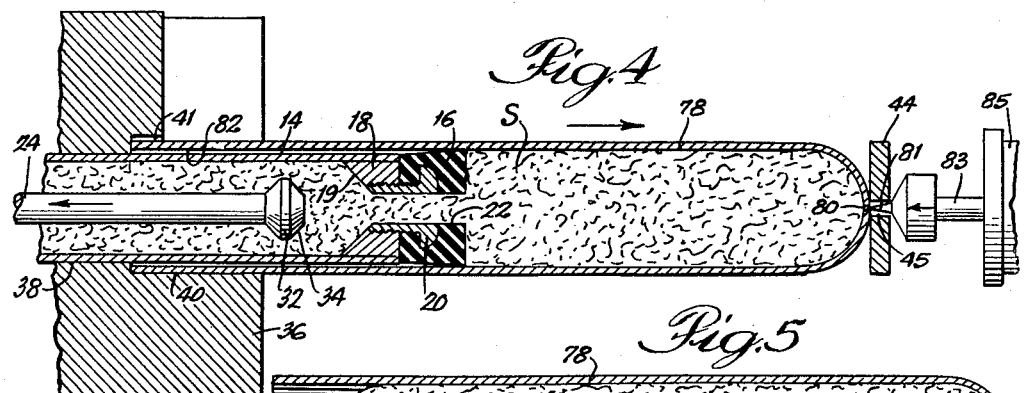
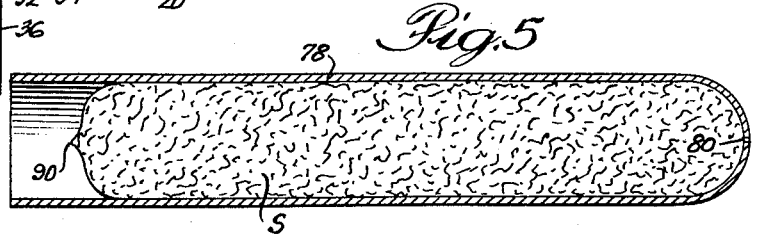
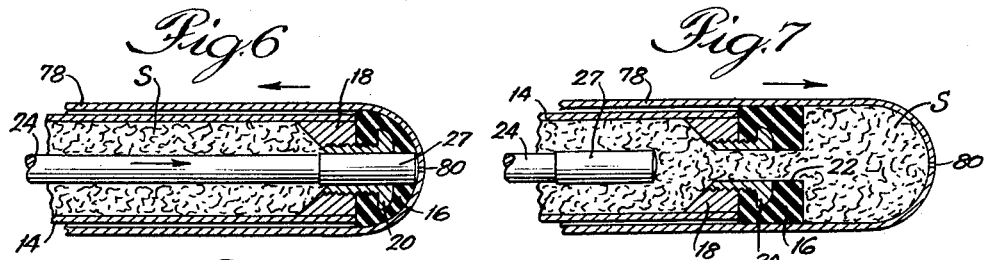
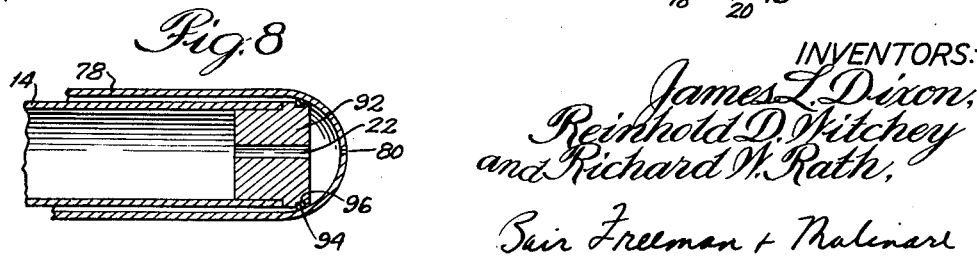

United States Patent Office 3,009,195
Patented Nov. 21, 1961

3,009,195
APPARATUS FOR FILLING SAUSAGE MOLDS
James L. Dixon, Reinhold D. Witchey, and Richard W. Rath, Waterloo, Iowa, assignors to The Rath Packing Company, Waterloo, Iowa, a corporation of Iowa
Filed Oct. 6, 1958, Ser. No. 765,521
14 Claims. (Cl. 17—39)

This invention relates to an apparatus and method for molding skinless sausages, particularly frankfurters, from fluid coaguable sausage emulsion. It has been proposed heretofore to fill a sausage-shaped mold with emuslion, coagulate the emulsion to form a solid external skin, remove the partially coagulated sausage from the mold and complete the cure outside the mold. Molding offers many advantages over the conventional method which comprises stuffing a plastic casing, tying the casing off into sausage lengths, curing and then removing from the casing. It is more economical due to the elimination of the cost of the casing and the labor required to remove the casing. In many instances sausages are damaged because of the difficulty encountered in removal from the casing. Furthermore, the mold, if completely filled with emulsion, controls accurately the quantity of emulsion per sausage and, consequently, the weight of any number of sausages will be substantially the same and the sausanges can be packaged without weighing. This advantage likewise effects substantial savings over the inaccurate method of sizing the sausages by tying the casing.

Although there have been a number of processes and machines proposed for the production of frankfurters by molding, none, so far as we know, has been completely satisfactory for commercial production of sausages. The fundamental difficulty blocking the way to successful molding and all of the advantages accruing therefrom has been the inability to fill the mold without trapping air at the mold surface. Even with filling nozzles which extend down into the bottom of the test tube-shaped mold it is difficult to displace all the air. The portion of the mold which involves the most difficulty is the open end through which filling takes place. In accordance with prior proposals this end is closed after filling by inserting a plug having a concave end to impart sausage shape to the emulsion. If this plug fits tightly within the mold to prevent the emulsion from spewing out between the plug and the inner wall of the mold, the annular passage is not large enough to permit the air to flow freely past the plug. On the other hand, if the space is increased so that all of the air is forced out from underneath the plug as it descends into contact with the sausage emulsion, a considerable amount of unsightly flash is produced due to the emulsion's rising into the venting space. If air is trapped between the mold and the emulsion the finished product has a void in the surface which renders the product unacceptable. If the sausage emulsion fills out the mold completely the result is an accurately shaped sausage, equal or superior to that made by conventional methods utilizing a casing.

The primary object of the present invention is to obviate these difficulties and to provide a method and means for eliminating trapped air in the mold to produce a sausage free of both internal and external voids.

Another object is to provide a device for filling the mold with an accurate quantity of emulsion without external metering means.

Another object is to provide a method whereby a rounded end characteristic of frankfurters is produced without placing an end plug in the open end of the mold after filling.

In a preferred form of the invention the sausage-shaped mold having one closed end containing a vent is filled through a nozzle terminating in a piston which fits snugly within the mold and has a central opening therethrough. The nozzle is connected to a source of sausage emulsion under pressure. As the piston descends into the mold the air is expelled through the vent in the closed end. When all the air has been evacuated, the vent hole is closed off and sausage emulsion is forced through the nozzle into the mold, thus causing the mold to move away from the piston as it is filled. Consequently, there is no opportunity for air to be drawn into the mold once it has been expelled because the space between the end of the mold and the piston is not enlarged until sausage emulsion has entered. A valve member may be provided within the nozzle through which the sausage emulsion is fed for closing the opening through the piston to arrest the flow of emulsion to the mold when it has been filled. The distance the mold travels with respect to the piston accurately determines the quantity of emulsion charged into the mold.

Another object of the invention is to provide means for accurately controlling the quantity of sausage emulsion fed into the mold and for immediately arresting the flow of emulsion when the mold has been filled with a predetermined quantity of emulsion.

These and other objects will become apparent from the following description when read in connection with the accompanying drawings, wherein:

FIGURE 1 is a plan view partly broken away of sausage molding apparatus constructed in accordance with the present invention;

FIGURE 2 is a side elevational view of the filling portion of the apparatus shown in FIGURE 1. The mold and jig therefor are shown in extended position in dotted lines;

FIGURE 4 is an enlarged sectional view through the filling conduit and the mold showing the deformable piston disposed within the end of the mold just prior to filling;

FIGURE 4 is a view similar to FIGURE 3 wherein the emulsion control valve is open and the mold is shown in partially filled position;

FIGURE 5 is a sectional view through a mold which has just been filled showing the configuration of the emulsion in the open end;

FIGURES 6 and 7 are sectional views through the end of a mold showing a modified form of emulsion control valve adapted to be inserted in the opening in the piston; and FIGURE 8 is a sectional view through the closed end of a mold showing a modified form of piston construction which utilizes an O-ring for sealing against the wall of the mold.

In the particular form of the invention shown in FIGURE 1 of the drawing the conduit 10 through which the sausage emulsion is discharged into the mold is stationary. It may be mounted on any suitable support (not shown). A stuffer (not shown) filled with sausage emulsion free of air and under high pressure connects through a suitable conduit to the filling 12 which forms a Y with the conduit 10. The conduit 10 tapers into a smaller conduit 14 of a diameter slightly smaller than the internal diameter of the mold which is to be filled on the apparatus. Conduit 14 terminates in a piston or plunger member 16 which is attached to the conduit, as best shown in FIGURE 4. An insert 18 is fixed in the end of the conduit 14 and has an internally threaded opening into which is screwed the threaded portion of metal insert 20, the head of which is disposed within the plunger 16. Where the plunger 16 is made of rubber or plastic the insert 20 may be molded in place. It will be noted that the plunger 16 and its insert 20 are provided with a central opening 22 of smaller diameter than the conduit 14 through which sausage emulsion is fed into the mold. In other words, the opening 22 comprises a nozzle.

Disposed concentrically within the conduit is a long-stemmed valve member 24 mounted for axial movement in bearing 29 secured concentrically within the conduit 10. Ring 26 seals the bearing against passage of emulsion. The head 32 seals at one end of the valve member is tapered as indicated at 34 so that it seats on the complementary face 19 of the plug or insert 18 to close off the nozzle opening 22 (FIGURE 3). The opposite end of the valve member 24 attaches to the piston 28 of a pneumatic cylinder 30 or other suitable actuating means connected to conduit 10 by a union 25. Cylinder 30 is adapted to move the valve member a fixed distance back and forth within the conduit to open and close nozzle 22.

A jig, indicated generally by the numeral 36, consists of a block 39 having a central bore 38 with a countersunk portion 40 for receiving the end of the mold. This is best illustrated in FIGURES 3 and 4. The conduit 14 fits within the bore 38 so that the jig 36 will slide back and forth on the conduit. Extending from the block 39 of the jig are a pair of rods 42, 43 which, at their outer ends, support a lock plate 44 for holding the mold against axial movement after it has been placed in the jig. The lock plate swivels about the rod 42 between the two nuts 48, as best shown in FIGURE 1. The opposite end of the lock plate 44 hooks over the opposite rod 43 and abuts against a nut 50 screwed thereon. Plate 44 has an opening 45 concentric with vent 80 in the end of the mold so that when the plate is in closed position the vent is not blocked.

Extending outwardly in a radial direction from the block 39 of the jig is a pair of handles 52 which facilitate operation operation of the jig by an operator, as will become apparent from the description of the operation below. In a mechanized form of the device the handles 52 may be connected by springs 54 to the main conduit 10 through suitable stationary arms 56. These springs are in tension and exert a force biasing the jig and, consequently the mold placed therein toward the end of the nozzle 22. Mechanical means, such as cams or pneumatic or hydraulic cylinders, may be used in place of springs to provide the desired yielding resistance.

As shown in FIGURE 2, a shaft 58 connects to the main support (not shown) for the filling device at its left end and is supported by an arm 72 having a split collar 73 embracing the conduit 14. The collar 73 swings open so that the filling unit may be removed from the rod 58 for cleaning purposes. Shaft 58 carries a pair of pilot valves 60 and 62 which are actuated by pins 68 and 64 disposed within the path of the jig 36 as it moves on conduit 14. It will be noted that the jig 36 has a collar 37 projecting from block 39 toward the left end thereof which is adapted to depress the pins 64 and 68 as the jig moves along the conduit 14. A stop 70 which is secured to the end of the shaft 58 by a set screw 71 or the like prevents the jig from moving off unless the stop is removed. Tubes 74 and 76 connect to the pilot valves 60 and 62, respectively, and lead at their opposite ends to control valves for the air cylinder 30. Consequently, as the jig moves along the conduit 14 the pilot valves 60, 62 actuate the control valves which in turn actuate the emulsion control valve member 24 by directing the flow of air to the air cylinder 30 in a well known manner. To vent air from the space between conduit 14 and mold 78, as the piston retracts, the countersunk portion 40 of the jig is ribbed to provide slits 41 for escape of air.

Referring now to FIGURE 3, it will be noted that the piston 16 is capable of being deformed so that it completely fills the end of the mold, designated by the numeral 78. For best results it is desirable to utilize a piston member or plunger which is made from a rubber-like material capable of being deformed in this manner. We have found that a low durometer solid rubber compound such as an acrylonitrile-styrene copolymer compounded to a hardness of about 40 durometer on the Shore A scale will serve admirably for this purpose. Any oil-resistant rubber or plastic capable of being deformed to conform to the rounded bottom of the mold is operable. The mold 78 is provided with a suitable vent opening 80 in the closed end thereof. The opposite end 82 of the mold is completely open so that the end of the conduit 14 and the piston thereon may be inserted within the mold. The side walls of the piston 16 must seal against the inner wall of the mold to provide effective operation. The piston 16 may be tapered away from the end to provide the seal without increasing the friction. The piston must slide within the mold cylinder, but without adversely affecting the seal therebetween.

To seal the vent 80 after the air has been removed so that emulsion is not expelled from the mold during filling, we provide a pointed plug 81 fixed on the end of a shaft 83 comprising part of a hydraulic cylinder 85. The cylinder is mounted securely to the support for the whole filling apparatus. The pointed plug 81 fits into the vent 80 through opening 45 in plate 44.

The practical operation of the device is as follows: The mold 78 is placed with its open end 82 disposed within the recessed portion 40 of the jig 36. The lock plate 44 is flipped over into locked position across the rods 42, 43 thus preventing any axial movement of the mold 78 within the jig. The opening 45 in the end of plate 44 is concentric with the vent 80 in the mold so that this vent is not closed off. The jig with the mold in place is then slid over the end of the conduit 14 and moved to the position shown in solid lines in FIGURE 2. The ends of the springs 54 are hooked over the handles 52. At this point the piston member 16 has descended into the bottom of the mold (FIGURE 3), forcing all air from the mold during its descent, the air being evacuated through the vent opening 80. Because the piston is deformable it comes in contact with the entire inner wall of the closed end of the mold, thereby completely occupying the space and displacing all air therein. Cylinder 85 is then actuated to advance the plug 81 into the vent 80 to seal the end of the mold. Deaerated sausage emulsion (or emulsion prepared in absence of air) under pressure is fed from fitting 12 into the conduit 10 and flows around bearing 29 into the smaller conduit 14 and nozzle 22. Consequently, the entire conduit 14 is completely filled with emulsion at all times and the emulsion will be ejected through the nozzle or opening 22 except when the valve head 32 has closed off that opening. As shown in FIGURE 3, the valve 32 is closed when the piston is at its lowermost point within the mold. When the piston is disposed within the bottom of the mold, the mold and the jig in which it is held have moved to the point where the collar 37 on the jig contacts the pin 64 to actuate the air valve 60. This in turn causes the air to flow into the right end of the cylinder 30 to retract the valve member 24 and permit sausage emulsion to flow through the nozzle or opening 22. The sausage emulsion is designated in the drawing by the letter "S." As the emulsion under pressure is forced out the end of the nozzle 22, the mold 78 is pushed away from the end of the conduit 14 against the yielding force of the springs 54 and/or the manual force which may be exerted by the operator against the handles 52 of the jig. It will be understood that the mold does not move until emulsion has been forced into the space between the end of the mold and the piston 16 and, consequently, there is no possibility for air to become trapped between the emulsion and the surface of the mold. As the sausage emulsion is fed into the space between the end of the mold and the piston, the mold and jig continue to move outwardly until they reach the position shown in dot and dash lines in FIGURE 2. The pointed plug 81 and cylinder 85 retract together in response to the advance of the jig and mold to keep the vent opening closed during the filling step. When the collar 37 on the jig strikes the pin 68 of valve 62, air flows into the left end of the cylinder 30, thus pushing the piston 28 to the right and causing the valve head 32 to seat against the face 19 and arrest the flow of sausage emulsion to the mold. The action of the valve is practically instantaneous and, consequently, the flow of emulsion to the mold is stopped immediately. In this way the quantity of emulsion charged into the mold is always the same, and is controlled by the relative linear movement between the piston and the mold. The volume of emulsion charged into the mold may be varied by changing the location of the valve 62 and its control pin 68 on shaft 58. The plug 81 retracts within cylinder 85 in response to actuation of another pilot valve (not shown) as said valve is contacted by collar 37 on jig 36.

The lock plate 44 is then raised to permit removal of the mold from the jig. Jig 36 is prevented from sliding off the conduit 14 by the stop 70. Stop 70 may be moved out of the path of the jig when it is desired to remove the jig for cleaning purposes. As the jig and the mold are moved outwardly the piston 16 traverses the remaining length of the mold and causes the sausage emulsion in contact with the end thereof to be drawn into a tip 90, as shown in FIGURE 5. Withdrawal of the flat ended piston in contact with the emulsion results in this tip formation every time the piston is removed from the mold. The mold is then placed in hot air or hot water to coagulate the outer surface of the emulsion so that the sausage has enough body to permit removal from the mold prior to final cure. The coagulating step and means for providing the heat for same are well known and are taught inter alia in United States Patents Nos. 994,714 and 2,860,991. During the partial coagulating step the tip 90 changes shape so that this end of the molded emulsion takes on a rounded configuration substantially the same as the opposite end, which was in contact with the closed end of the mold. The end appears to expand upon application of heat although the theory as to what brings about the change in shape is not completely understood. The molded sausage duplicates to a remarkable extent the configuration of sausages produced by tying off a casing. Furthermore, each sausage has a completely smooth external surface produced because of the elimination of all air from between the emulsion and the inner surface of the mold. Within less than a minute the coagulated skin can be built up to the point where the partially coagulated sausage may be removed. Removal is accomplished by injecting a stream of air through the vent opening 80 in the closed end of the mold 78. After removal from the mold the sausage may be given further treatment in accordance with conventional practice. In the case of frankfurters the partially coagulated sausage is treated with smoke and the internal temperature is elevated to a minimum of 140° F. by passing through a steam chest or other means.

In FIGURES 6 and 7 we have shown a modified form of the emulsion control valve. In this form the valve stem 24 terminates in a valve member 27 of diameter sufficiently small to permit insertion in the nozzle 22 of the piston 16. It has been found that when the emulsion is completely expelled from the nozzle 22 before removing the mold, the configuration of the tip 90 more accurately conforms to the rounded design desired. Any tendency to "drip" is eliminated. In some instances where the valve is of the type shown in FIGURES 3 and 4, the emulsion may be removed from the opening 22 upon withdrawal and this causes the tip to be unnecessarily elongated, which shape is undesirable. As shown in FIGURE 6, when the valve is closed all of the sausage emulsion is extruded from the nozzle. The end member 27 should be rounded so that it can be inserted easily into the opening 22 of piston 16 and should be of such diameter that a good seal is effected between the outside of the valve and the inside of the piston opening.

Another form of piston is shown in FIGURE 8. In this form piston 92 is not completely deformable but will cause expulsion of most of the air from the closed end of the mold through the vent 80. The seal between the piston and the inner surface of the mold is effected by means of a resilient O-ring 94 which is seated in circumferential groove 96 at the end of the piston 92. This type of piston produces a good sausage in most instances but occasionally there will be some malformation in the closed end. This may be avoided by drawing a vacuum through the vent opening 80 just prior to opening the emulsion control valve 24. This form of the invention is suitable for the preparation of breakfast sausage where the surface texture is not as critical as in frankfurters. Such sausage is often sold in cans and in such case the ends may be flat rather than rounded. This mold is modified accordingly at the closed end.

It will be understood that this invention is also useful in molding slicing sausages like Bologna. It will also be understood that other modifications may be made in the device illustrated herein. For example, it may be desirable to mold a plurality of sausages at one time rather than a single sausage. In such case the apparatus may be enlarged to include several nozzle units fed from a common source and connected integrally, preferably in a circumferential arrangement. In such case the jig would be designed to carry a plurality of molds similarly located on the circumference of a circle and adapted to cooperate with each of the conduits and pistons of the molding device. Thus, for example, from six to twelve sausages can be molded simultaneously.

Other means may be employed for actuating the valve 24. Pneumatic or fluid cylinders have been found to be very satisfactory but a synchronized mechanical means would be equally satisfactory. Likewise, means other than springs 54 may be utilized to yieldably resist the movement of the mold from the conduit and piston. A stationary hydraulic cylinder having its piston shaft engaging the end of the jig is satisfactory for this purpose. It will also be apparent that the piston 16 may move within a stationary mold rather than the mold moving on a stationary piston.

It will be apparent from the foregoing that we have provided an apparatus which is capable of producing a sausage without voids or pits in either the outer surface or the internal structure thereof. Furthermore, the sausage conforms very closely to the configuration imparted by the conventional method of tying off the casing. Uniform weight from one sausage to the next is insured because (1) the volume of the emulsion is accurately controlled by the relative movement of the piston with respect to the mold and (2) no air is present in the shaped emulsion. If the sausages are of such size that ten are required to make a pound, any ten sausages coming out of the mold will weigh one pound, whereas heretofore it has been necessary to juggle the sausages in order to find some that were overweight to compensate for others which were underweight, and vice versa. The present invention, therefore, results in a practical process for commercially molding sausage, particularly frankfurters.

It will be appreciated that other modifications can be made in the apparatus and method without departing from the true spirit and scope of our invention. It is, therefore, our intention to cover as part of our invention equivalents and modified elements and steps that may reasonably be included within the scope of the appended claims.

We claim as our invention:

1. A device for molding articles from plastic material which comprises a conduit terminating in a piston having a central opening therethrough, sealing means surrounding the piston, an elongated mold having one closed end including a vent and one open end adapted to receive said piston with said sealing means in sliding and sealing engagement with the inner walls of said mold, means for feeding said plastic material under positive pressure to said conduit and through said opening into said mold, and yieldable means bearing against said mold for yieldably resisting the force of said pressurized plastic material tending to separate said mold and piston, whereby space is provided within said mold for receiving said material as the mold and piston move away from each other in opposition to said yieldable means.

2. The device of claim 1 wherein said sealing means comprises an oil-resistant rubber O-ring.

3. The device of claim 1 which also includes means for sealing said vent during filling of the mold.

4. A device for molding sausages from fluid emulsion comprising a sausage-shaped mold having one open end and one closed end containing a vent, means for sealing said vent, a conduit for emulsion terminating in a soft, resilient plunger capable of deforming the contour of said closed end to expel air therefrom and of moving in sealing engagement over the inner walls of said mold, said mold and plunger being movable with respect to each other, said plunger having a central opening therethrough, means for feeding emulsion under pressure to said conduit for flow into said mold through said opening, a valve member mounted within said conduit for controlling flow of emulsion through said opening, and yieldable means bearing against said mold for yieldably resisting the force tending to separate said mold and said plunger as pressurized emulsion is introduced into said mold, whereby the space between said plunger and said closed end is enlarged only by the introduction of emulsion overcoming said yieldable means.

5. The device of claim 4 wherein said plunger is made of an oil-resistant rubber having a Shore A durometer of not more than 40.

6. The device of claim 4 wherein said plunger has a flat end and is slightly flared toward said end.

7. The device of claim 4 wherein said valve member is shaped to enter and fill the opening in said plunger to arrest flow of emulsion therethrough.

8. The device of claim 4 wherein said conduit is stationary and said mold is movable.

9. A device for molding sausages from fluid emulsion comprising an elongated conduit terminating at one end in a piston member having a central opening therethrough, means connecting to said conduit for introducing fluid emulsion under pressure removable jig, means for mounting a cylindrical mold on said one end of the conduit with said piston inside the mold, means connected to said jig for biasing said mold toward said conduit to urge the piston toward the bottom of the mold, a long-stemmed valve member mounted for axial movement concentrically within said conduit, the end of which is cooperative with said central opening to control the flow of emulsion through said opening and means for actuating said valve in response to the position of said piston within said mold.

10. The device of claim 9 wherein said actuating means comprises a fluid cylinder mounted on the other end of said conduit.

11. The device of claim 9 wherein said jig means has a bore therethrough to permit sliding the jig along the conduit.

12. The device of claim 9 wherein said actuating means comprises a fluid cylinder mounted on the other end of said conduit, said jig means has a bore therethrough to permit sliding the jig along the conduit and which device includes valves in a fluid line adjacent said jig actuated by the movement of said jig for directing fluid to said cylinder for control of said valve member within said conduit.

13. The device of claim 9 wherein said piston is made from deformable, oil-resistant rubber.

14. A device for molding articles from plastic material which comprises a material conduit including a piston member, an elongated mold having one closed end, said piston being fitted to the inside surface of said mold for sliding and sealing engagement therewith, vent means communicating with the interior of said mold between said piston and said closed end, means for feeding said plastic material under positve pressure to said conduit, past said piston, and into said mold, and yieldable means associated with said mold for yieldably resisting the force of said pressurized plastic material tending to separate said mold and piston.

References Cited in the file of this patent
UNITED STATES PATENTS

| | | |
|---|---|---|
| 833,988 | Valerius | Oct. 23, 1906 |
| 1,397,520 | Howe | Nov. 22, 1921 |
| 2,128,734 | Schmidt | Aug. 30, 1938 |
| 2,144,628 | Hotersall | Jan. 24, 1939 |
| 2,387,452 | Lundal et al. | Oct. 23, 1945 |
| 2,635,799 | Hoy | Apr. 21, 1953 |
| 2,641,797 | Waltman | June 16, 1953 |